United States Patent
Fang et al.

(10) Patent No.: US 11,102,693 B1
(45) Date of Patent: Aug. 24, 2021

(54) SYSTEMS AND METHODS FOR ASSIGNING A MOBILITY PARAMETER TO A WIRELESS DEVICE OPERATING IN CONNECTED MODE

(71) Applicant: Sprint Spectrum LP, Overland Park, KS (US)

(72) Inventors: Zheng Fang, McLean, VA (US); Roger Danforth Bartlett, Merriam, KS (US); Zheng Cai, Fairfax, VA (US); Yu Wang, Fairfax, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 535 days.

(21) Appl. No.: 15/234,046

(22) Filed: Aug. 11, 2016

(51) Int. Cl.
| H04W 36/30 | (2009.01) |
| H04W 4/90 | (2018.01) |
| H04W 52/36 | (2009.01) |
| H04L 12/741 | (2013.01) |
| H04L 12/26 | (2006.01) |
| H04W 24/10 | (2009.01) |
| H04W 4/02 | (2018.01) |
| H04W 88/08 | (2009.01) |
| H04W 88/02 | (2009.01) |

(52) U.S. Cl.
CPC ............ *H04W 36/30* (2013.01); *H04L 43/16* (2013.01); *H04L 45/745* (2013.01); *H04W 4/023* (2013.01); *H04W 4/90* (2018.02); *H04W 24/10* (2013.01); *H04W 52/365* (2013.01); *H04W 88/02* (2013.01); *H04W 88/08* (2013.01)

(58) Field of Classification Search
CPC ..... H04W 4/02; H04W 4/023; H04W 52/365; H04W 36/30; H04W 4/90; H04W 24/10; H04L 45/745; H04L 43/16
See application file for complete search history.

(56) References Cited

U.S. PATENT DOCUMENTS

| 9,374,802 | B2* | 6/2016 | Siomina | H04W 4/02 |
| 9,386,542 | B2* | 7/2016 | Russell | H04W 52/247 |
| 2012/0309404 | A1* | 12/2012 | Suzuki | H04W 24/10 455/450 |
| 2012/0315890 | A1* | 12/2012 | Suzuki | H04W 24/10 455/422.1 |
| 2013/0065612 | A1* | 3/2013 | Siomina | H04W 24/10 455/456.2 |
| 2013/0114446 | A1* | 5/2013 | Liu | H04W 24/10 370/252 |
| 2014/0016653 | A1* | 1/2014 | Oh | H04W 72/0406 370/474 |
| 2014/0194145 | A1* | 7/2014 | Do | G01S 5/14 455/456.3 |

(Continued)

*Primary Examiner* — Asghar H Bilgrami (57) ABSTRACT

Systems and methods are described for assigning a mobility parameter to a wireless device. One or more measurement reports may be collected at an access node from the wireless device. A pathloss change for the wireless device may be calculated based on the collected measurement reports. When the calculated pathloss change exceeds a threshold, the wireless device may be instructed to report surplus transmit power at the access node. The reported surplus transmit power may be correlated to preset location environments and a position of the wireless device classified based on the correlation. A mobility parameter may be assigned for the wireless device.

19 Claims, 6 Drawing Sheets

(56) References Cited

U.S. PATENT DOCUMENTS

| | | | | |
|---|---|---|---|---|
| 2016/0157165 A1* | 6/2016 | Xie | ................... | H04W 36/0083 |
| | | | | 455/434 |
| 2016/0219475 A1* | 7/2016 | Kim | ......................... | H04L 5/00 |
| 2016/0360362 A1* | 12/2016 | Do | ........................ | H04W 4/023 |
| 2017/0339527 A9* | 11/2017 | Narasimha | ............ | G01S 5/0289 |

* cited by examiner

| Pathloss (dBm) | Reference Power Headroom (dBm) | UE Reported Power Headroom (dBm) | UE Location |
|---|---|---|---|
| 140 | 0 | 0 | Indoor |
| 139 | 0 | 0 | Indoor |
| 138 | 1 | 0 | Indoor |
| 137 | 1 | 0 | Indoor |
| 136 | 2 | 0 | Indoor |
| 135 | 2 | 0 | Indoor |
| 134 | 3 | 0 | Indoor |
| 133 | 3 | 0 | Indoor |
| 132 | 4 | 1 | Indoor |
| 131 | 4 | 1 | Indoor |
| 134 | 3 | 3 | Outdoor |
| 133 | 3 | 3 | Outdoor |
| 132 | 4 | 4 | Outdoor |
| 131 | 4 | 4 | Outdoor |

SYSTEMS AND METHODS FOR ASSIGNING A MOBILITY PARAMETER TO A WIRELESS DEVICE OPERATING IN CONNECTED MODE

TECHNICAL BACKGROUND

As cellular networks develop and wireless device usage becomes more ubiquitous, there is an increasing need for Location Based Services (LBS), particularly in the event of an emergency. The most widely-used, high-accuracy location technique is Assisted GNSS (A-GNSS), which uses ranging signals from Global Navigation Satellite Systems (GNSS), along with data from the cellular network, to obtain outdoor location fixes of wireless devices operating in a radio range of an access node. But, as wireless devices move to dense, urban areas with closely-situated, multi-story buildings and/or indoors, obtaining a location fix using only A-GNSS is difficult due to multipath reflections and interferences/obscurations, which can increase error margins for a position of the wireless device to hundreds of feet. In an emergency situation, error margins of even a few feet may be detrimental.

Overview

Systems and methods for assigning a mobility parameter to a wireless device are disclosed. One or more power reports from a wireless device operating in a radio range of an access node may be collected at the access node. A pathloss change for the device may be calculated based on the collected power reports. Both the collected power reports and the calculated pathloss change may be compared to predetermined value ranges to determine a location of the wireless device in the radio range of the access node. A mobility parameter for the wireless device may be assigned based on the determined location of the wireless device within the radio range of the access node.

Systems and methods for classifying a wireless device operating in a radio range of an access node are also disclosed. A wireless device may be instructed to report surplus transmit power at an access node when a pathloss change of the wireless device exceeds a threshold. The reported surplus transmit power may be correlated to preset location value ranges. A location of the wireless device in the radio range of the access node may be classified as indoor or outdoor based on the correlation.

DETAILED DESCRIPTION

As cellular networks develop and wireless device usage becomes more ubiquitous, there is an increasing demand for Location Based Services (LBS). LBS are driven by two major requirements: emergency services and application-based services (e.g., maps, location-based advertising, etc.). The most widely-used, high accuracy location technique is Assisted GNSS (A-GNSS), which uses ranging signals from Global Navigation Satellite Systems (GNSS), along with data from the cellular network, to obtain outdoor positions and/or location fixes of wireless devices operating in a radio range of an access node. But, as wireless devices move into dense, urban areas populated with closely-situated, multi-story buildings and/or indoors, obtaining a position and/or location fix of the wireless device using only A-GNSS is difficult due to increased multipath reflections and interferences/obscurations, which can increase error margins for a reported position and/or location fix of the wireless device. In an emergency, error margins of even a few feet may be detrimental.

To meet evolving Federal Communication Commission (FCC) Wireless Enhanced 911 (E911) regulations, in Release 9 of 3GPP TS 36.355 Evolved Terrestrial Radio Access (E-UTRA); LTE Positioning Protocol (LPP), the Third Generation Partnership Project (3GPP) specifies Enhanced Cell ID (ECID) and Observed Time Difference of Arrival (OTDoA) positioning techniques for augmenting A-GNSS, the entire contents of which are incorporated herein by reference. ECID and/or OTDoA augmented A-GNSS decrease error margins for a position and/or location fix reported by a wireless device operating in dense, urban areas populated with closely-situated, multi-story buildings and/or indoors, although at the cost of increased network complexity.

Figure 1A:
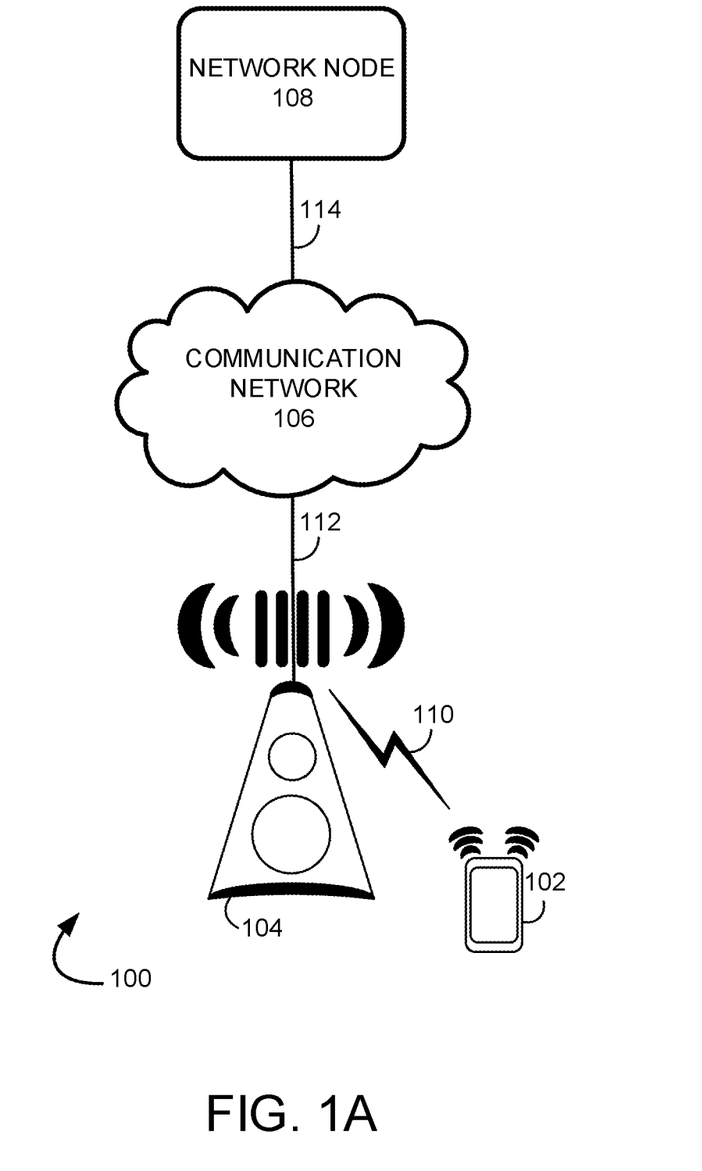
FIG. 1A illustrates an exemplary communication system for assigning a mobility parameter to a wireless device operating in connected mode.
Figure 1B:
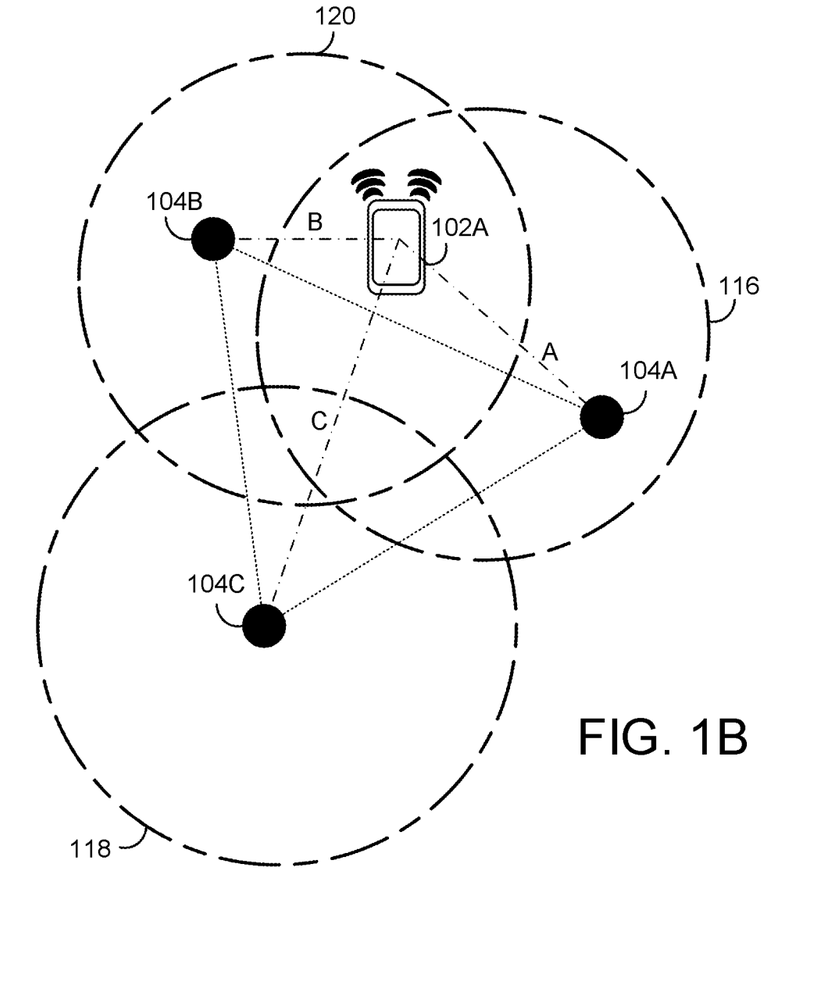
FIG. 1B illustrates a portion of the exemplary communication system for assigning a mobility parameter to a wireless devices operating in connected mode illustrated in FIG. 1A.

For example, referring to FIGS. 1A and 1B, wireless device 102, 102A may be equipped with an integrated (i.e., multiple satellite system, such as GPS and GLONASS, GLObal Navigation Satellite System) transceiver configured to detect ranging satellite signals from access nodes 104, 104A, 104B, and/or 104C (or other network elements). Wireless device 102, 102A may use the detected ranging satellite signals to compute a position and/or location fix of wireless device 102, 102A in a radio range 116, 118, 120 of access nodes 104, 104A, 104B, and/or 104C. But, ranging satellite signals may increase a Time-to-First-Fix (TTFF), for example, a time required for the transceiver (not shown) of wireless device 102, 102A to acquire satellite signals and navigation data and calculate a position solution (called a fix), while simultaneously decreasing the battery and processing power of the wireless device 102, 102A.

To counteract TTFF increases, network 106 may boost ranging satellite signals received at a transceiver (not shown) of wireless device 102, 102A (or other network element) with data provided by the network 106 (e.g., through a GPS and/or GLONASS message sent to wireless device 102, 102A via, for example, access node 104, 104A, 104B, and/or 104C), which data the transceiver (not shown) can use to accelerate the process of acquiring ranging satellite signals to determine an outdoor position and/or location fix of the wireless device 102, 102A in a radio range 116, 118, 120 of access nodes 104, 104A, 104B, and/or 104C while conserving the battery and processing power of the wireless device 102, 102A (i.e., A-GNSS).

A-GNSS can be either mobile-assisted or mobile-based. For example, in mobile-assisted A-GNSS, the network configures wireless device 102, 102A to measure ranging satellite signals and report the measurement data (e.g., code phase, Doppler, signal strength, etc., associated with the GNSS ranging satellite signals) at access nodes 104, 104A, 104B, and/or 104C (or other network element). Access nodes 104, 104A, 104B, and/or 104C use the reported measurement data to calculate an outdoor position and/or location fix of the wireless device 102, 102A in a radio range 116, 118, 120 of access nodes 104, 104A, 104B, and/or 104C. Alternatively, for mobile-based A-GNSS, wireless device 102, 102A may be configured to measure ranging satellite signals and, based on the measurement data (e.g., code phase, Doppler, signal strength, etc., associated with the GNSS ranging satellite signals), calculate an outdoor position and/or location fix of the wireless device 102, 102A in the radio range 116, 118, 120 of access node 104, 104A, 104B, and/or 104C using an iterative algorithm before reporting the calculated position and/or location fix at access node 104, 104A, 104B, and/or 104C.

Although both mobile-assisted and mobile-based A-GNSS improve reported position and/or location fix accuracy outdoors (e.g., where there exists a reasonably clear view of the sky), as the wireless device 102, 102A moves into dense, urban areas populated with closely-situated, multi-story buildings and/or indoors, obtaining an accurate position and/or location fix of wireless device 102, 102A using only A-GNSS is difficult due to increased multipath reflections and interferences/obscurations, which increase error margins for a position and/or location fix reported by wireless device 102, 102A.

Referring to FIG. 1B, as wireless device 102, 102A moves into a dense, urban area populated with closely-situated, multi-story buildings and/or indoors (i.e., where reception of A-GNSS ranging satellite signals A, B, C from access nodes 104A, 104B, 104C are limited due to multipath reflections and interference/obscuration) from an outdoor location within a radio range 116 of access node 104A, network 106 (illustrated in FIG. 1A) can boost A-GNSS with ECID and/or OTDoA techniques to decrease error margins for urban or indoor location fixes of wireless device 102, 102A reported at access nodes 104A, 104B, and/or 104C.

ECID may be initiated through a Lower Layer Protocol (LLP) (e.g., with an ECID RequestLocationInformation request message) and is used to enhance the accuracy of Cell ID (CID) positioning (i.e., where the estimated position of the wireless device 102A is the position of the access node 104A that the wireless device 102A is camped-on). For example, network 106 and/or access node 104A can use ECID boosted A-GNSS to estimate a position and/or location fix of wireless device 102A in a radio range 116 of camped-on access node 104A using a Round Trip Time (RTT) of UL and/or DL signals sent between the camped-on access node 104A and wireless device 102A. The RTT of UL and/or DL signals can be determined using Timing Advance (TA) measurements (i.e., difference between transmit/receive time), either from access node 104A and/or by directly querying the wireless device 102A, an ID of access node 104A, and estimated timing/power of detected neighboring access nodes 104B, 104C. Network 106 and/or access node 104A may report additional information, for example, an Angle of Arrival (AoA) of UL signals sent from wireless device 102A to access node 104A. Network 106 and/or access node 104A estimates a position and/or location fix of the wireless device 102A based on the above information and its knowledge of a position of access nodes 104A, 104B, and/or 104C.

OTDoA may be initiated through a Lower Layer Protocol (LLP) (e.g., with an OTDoA RequestLocationInformation request message) and is a Multilateration (MLAT) technique, which uses time difference measurements between specific signals from multiple access nodes 104A, 104B, 104C to estimate a position and/or location fix of wireless device 102A in a radio range 116 of access node 104A. For example, network 106 (illustrated in FIG. 1A) may request a set of Reference Signal Time Difference (RSTD) measurements from wireless device 102A via an OTDoA RequestLocationInformation request message. Together with the OTDoA RequestLocationInformation request message, network 106 may provide wireless device 102A with assistance data (e.g., a list of access nodes 104A, 104B, 104C, Positioning Reference Signal (PRS) parameters for the access nodes 104A, 104B, 104C, which include bandwidth, periodicity, etc.). Wireless device 102A performs RSTD measurements of Reference Signals (RS), embedded in DL signals, reported by two or more access nodes 104A, 104B, 104C at wireless device 102A during a period of time (e.g., up to 8 or 16 periods of the PRS signals); the RSTD measurements consist of estimating an exact time offset between the PRS' from different access nodes 104A, 104B, 104C. Wireless device 102A reports the RSTD measurements with, for example, an estimate of the measurement quality, at network 106 and/or access node 104A. Using the RSTD estimates of access nodes 104A, 104B, and/or 104C along with known locations of access nodes 104A, 104B, and/or 104C and transmit time offsets between PRS' from different access nodes 104A, 104B, and/or 104C, network 106 may estimate a position and/or location fix of wireless device 102A in a radio range 116 of access node 104A.

But, while ECID and/or OTDoA boosted A-GNSS decrease error margins for a position and/or location fix reported by a wireless device 102, 102A operating in a dense, urban area populated with closely-situated, multi-story buildings and/or indoors, the error margins are decreased at the cost of increased network complexity. To decrease network complexity, in an exemplary embodiment, system 100 via network 106 may apply a mobility parameter to a wireless device 102, 102A based on an operating environment of the wireless device 102, 102A. For example, wireless device 102, 102A operating in a radio range 116 of access nodes 104, 104A, 104B, and/or 104C may provide measurement reports at a camped-on access node 104A. Using the collected measurement data (e.g., code phase, Doppler, signal strength/quality, etc., associated with the ranging satellite signals) wireless device 102, 102A may calculate a signaling pathloss change (A) and, when the calculated signaling pathloss A meets and/or exceeds a threshold, report the calculated signaling pathloss A and a (current) Uplink (UL) Tx Power state (i.e., surplus Tx Power, Power Headroom Report (PHR), and/or Extended Power Headroom Report (ePHR), etc.) at access node 104A. Access node 104A may compare the reported UL Tx Power state (i.e., surplus Tx Power, PHR, ePHR, etc.) of the wireless device 102A to reference value ranges for UL Tx Power states (i.e., surplus Tx Power, PHR, ePHR, etc.) stored at access node 104A to classify a position and/or location fix of the wireless device 102A in a radio range 116 of access node 104A as an outdoor, dense/urban and/or indoor environment. Based on the classification, access node 104A can adjust/assign a mobility parameter to the wireless device 102A and disable/mobilize ECID and/or OTDoA boosted A-GNSS, which reduces TTFF and network complexity.

Communication system 100 can comprise wireless devices 102, 102A, access nodes 104, 104A, 104B, 104C (including scheduling modules and/or associated scheduling nodes), communication network 106, and network node 108. Other network elements may be present in the communication system 100 to facilitate communication but are omitted for clarity, such as base stations, base station controllers, gateways, Mobile Switching Centers (MSC), Dispatch Application Processors (DAPs), and location registers such as a Home Location Register (HLR) or Visitor Location Register (VLR). Furthermore, other network elements may be present to facilitate communication, such as between access nodes 104, 104A, 104B, and/or 104C and communication network 106, which are omitted for clarity, including additional processing nodes, controller nodes, routers, gateways, and physical and/or wireless data links for carrying data among the various network elements.

Wireless device 102, 102A can be any device configured to communicate over communication system 100 using a wireless interface. For example, wireless device 102, 102A can include a remote terminal unit, a cell phone, a smart phone, a computing platform such as a laptop, palmtop, or a tablet, a Personal Digital Assistant (PDA), or an internet access device, and combinations thereof. It is noted that while FIGS. 1A and 1B illustrate one wireless device 102, 102A in communication with access node 104, 104A, 104B, and/or 104C, any number of wireless devices can be implemented according to various exemplary embodiments disclosed herein.

The wireless interface of wireless device 102, 102A can include one or more transceivers for transmitting and receiving data over communication system 100. Each transceiver can be associated with the same or different frequency bands, the same or different radio access technologies, the same or different network providers, and/or the same or different services. For example, wireless device 102, 102A can include a transceiver that is associated with one or more of the following: Code Division Multiple Access (CDMA), Global System for Mobile Communications (GSM), Worldwide Interoperability for Microwave Access (WiMAX), Long Term Evolution (LTE), and/or High-Speed Downlink Packet Access (HSDPA), IEEE 802.11, Wireless Fidelity (WiFi), Bluetooth, Zigbee, Infrared Data Association (IrDA), Multimedia Broadcast Multicast Service (MBMS), etc.

Wireless device 102, 102A can be in communication with access node 104, 104A, 104B, and/or 104C through, for example, communication link 110. Link 110 can use various communication media, such as air, space, metal, optical fiber, or some other signal propagation path—including combinations thereof. Link 110 can comprise many different signals sharing the same link. Link 110 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 102, 102A and access node 104, 104A, 104B, and/or 104C could share the same representative wireless link, but be transferred over different communication sessions, frequencies, timeslots, packets, ports, sockets, logical transport links, or in different locations—including combinations thereof.

Wireless device 102, 102A can transmit and/or receive information over system 100 using various communication services. These services can include various voice, data, and/or MBMS services and applications. For example, mobile voice services, mobile data services, Push-to-Talk (PTT) services, internet services, web browsing, email, pictures, picture messaging, video, video messaging, broadcast video, audio, voicemail, music, MP3's, ring tones, stock tickers, news alerts, etc.

Access nodes 104, 104A, 104B, 104C can be any network node configured to provide communication between wireless device 102, 102A and communication network 106. Access nodes 104, 104A, 104B, 104C can be standard access nodes and/or short range, low-power access nodes. Access nodes 104, 104A, 104B, 104C can be within at least a portion of an overlapping coverage area of the other 104, 104A, 104B, 104C, where each access node 104, 104A, 104B, 104C has a coverage area that includes a cell-edge portion between the full strength coverage area and the edge of the cell coverage area.

A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty-five kilometers and an output power in the tens of watts. A short range access node can include a microcell access node, a picocell access node, a femtocell access node, or the like such as a home NodeB or a home eNodeB device. In an exemplary embodiment, a picocell access node can have a coverage area of approximately a half a kilometer and an output power of less than one watt. In yet another exemplary embodiment, a femtocell access node can have a coverage area in the range of fifty to two-hundred meters and an output power in the range of 0.5 to 2 watts. Femtocell access nodes can be cellular access nodes or WiFi access nodes. In addition, a wireless device configured to enter a hotspot mode can be a femtocell access node. It is noted that while two access nodes 104, 104A, 104B, 104C are illustrated in each of FIGS. 1A and 1B, any number of access nodes can be implemented within system 100.

Access nodes 104, 104A, 104B, 104C can comprise a processor and associated circuitry to execute or direct the execution of computer-readable instructions to obtain information. Access nodes 104, 104A, 104B, 104C can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 104, 104A, 104B, 104C can receive instructions and other input at a user interface.

Network node 108 can be any network node configured to communicate information and/or control information over system 100. For example, network node 108 can receive information from or transmit information to wireless device 102, 102A over system 100. For ease of illustration, network node 108 is shown to be located within the backhaul of the system 100. However, network node 108 could alternatively be between access nodes 104, 104A, 104B, and/or 104C and communication network 106. Network node 108 can be a standalone computing device, computing system, or network component, and can be accessible, for example, by a wired or wireless connection, or through an indirect connection such as through a computer network or communication network. For example, network node 108 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that network node 108 is not limited to any specific technology architecture, such as LTE and can be used with any network architecture and/or protocol.

Network node 108 can comprise a processor and associated circuitry to execute or direct the execution of computer-readable instructions to obtain information. Network node 108 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Network node 108 can receive instructions and other input at a user interface.

Access node 104, 104A, 104B, and/or 104C can be in communication with access node 104, 104A, 104B, and/or 104C through communication links (illustrated in FIG. 1B) and with communication network 106 through communication link 112 (illustrated in FIG. 1A). Network node 108 can be in communication with communication network 106 through communication link 114. Communication links 112, 114 can be wired or wireless and use various communication protocols such as Internet, Internet Protocol (IP), Local-Area Network (LAN), optical networking, Hybrid Fiber Coax (HFC), telephony, T1, or some other communication format—including combinations, improvements or variations thereof. Wireless communication links can be a radio frequency, microwave, infrared, or other similar signal, and can use a suitable communication protocol, for example, GSM, CDMA, WiMAX, or LTE, or combinations thereof. Other wireless protocols can also be used. Links 112, 114 can be a direct link or might include various equipment, intermediate components, systems, and networks.

Communication network 106 can be a wired and/or wireless communication network, and can comprise processing nodes, routers, gateways, and physical and/or wireless data links for carrying data among various network elements, including combinations thereof, and can include a LAN or Wide-Area Network (WAN), and an internetwork (including the internet). Communication network 106 can be capable of carrying data, for example, to support voice, PTT, broadcast video, and data communications by a wireless device such as wireless devices 102, 102A. Wireless network protocols can comprise MBMS, CDMA 1×RTT, GSM, Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and WiMAX. Wired network protocols that may be utilized by communication network 106 comprise Ethernet, Fast Ethernet, Gigabit Ethernet, Local Talk (such as Carrier Sense Multiple Access with collision Avoidance), Token Ring, Fiber Distributed Data Interface (FDDI), and Asynchronous Transfer Mode (ATM). Communication network 106 can also comprise additional base stations, controller nodes, telephony switches, internet routers, network gateways, computer systems, communication links, or some other type of communication equipment, and combinations thereof.

Figure 2:
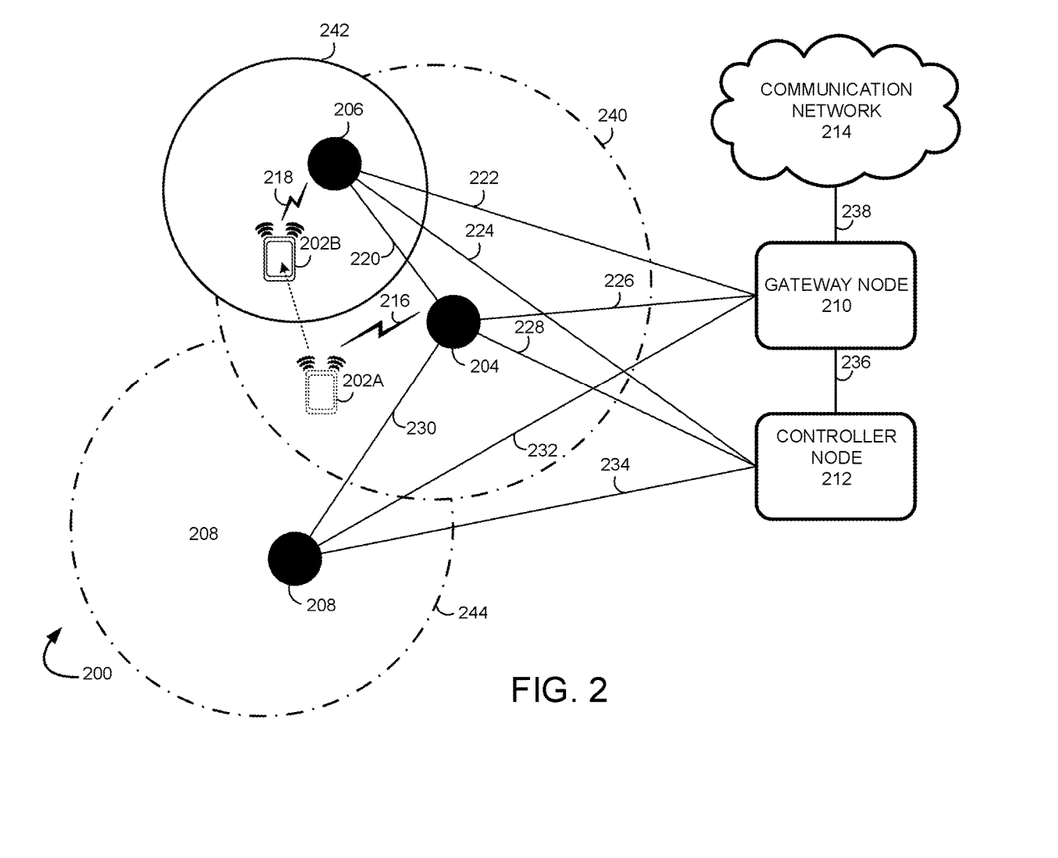
FIG. 2 illustrates another exemplary communication system for assigning a mobility parameter to a wireless device operating in connected mode.

FIG. 2 illustrates an exemplary communication system 200 for assigning a mobility parameter to a wireless device operating in connected mode. Communication system 200 can comprise wireless devices 202A, 202B, access nodes 204, 206, 208, gateway node 210, controller node 212, and communication network 214. Other network elements may be present in the communication system 200 to facilitate communication but are omitted for clarity, such as base stations, base station controllers, gateways, MSC, DPAs, and location registers such as a HLR or VLR. Furthermore, other network elements may be present to facilitate communication, such as between access nodes 204, 206, 208 and communication network 214, which are omitted for clarity, including additional processing nodes, routers, gateways, and physical and/or wireless data links for carrying data among the various network elements.

Wireless devices 202A, 202B can be any device configured to communicate over system 200 using a wireless interface. For example, wireless devices 202A, 202B can include a remote terminal unit, a cell phone, a smart phone, a computing platform such as a laptop, palmtop, or a tablet, a PDA, or an internet access device, and combinations thereof. The wireless interface of wireless devices 202A, 202B can include one or more transceivers (not shown) for transmitting and receiving data over communication system 200. Each transceiver can be associated with the same or different frequency bands, the same or different radio access technologies, the same or different network providers, and/or the same or different services. For example, wireless devices 202A, 202B can include a transceiver that is associated with one or more of the following: CDMA, GSM, WiMAX, LTE, HSDPA, IEEE 802.11, WiFi, Bluetooth, Zigbee, IrDA, MBMS, etc.

Wireless devices 202A, 202B can be in communication with access nodes 204, 206, and/or 208 through communication links 216, 218. Links 216, 218 can use various communication media, such as air, space, metal, optical fiber, or some other signal propagation path—including combinations thereof. Links 216, 218 may comprise many different signals sharing the same link. Links 216, 218 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 202A, 202B and access node 206 could share the same representative wireless link, but be transferred over different communication sessions, frequencies, timeslots, packets, ports, sockets, logical transport links, or in different directions—including combinations thereof.

Wireless devices 202A, 202B can transmit and/or receive information over system 200 using various communication services. These services can include various voice, data, and/or MBMS services and applications. For example, mobile voice services, mobile data services, PTT services, internet services, web browsing, email, pictures, picture messaging, video, video messaging, broadcast video, audio, voicemail, music, MP3's, ring tones, stock tickers, new alerts, etc.

Access nodes 204, 206, 208 can be any network node configured to provide communication between wireless devices 202A, 202B and communication network 214. Access nodes 204, 206, 208 can be standard access nodes or short range, low-power access nodes. At least a portion of a coverage area 240, 242, 244 of access nodes 204, 206, 208 can be overlapping with the other 204, 206, 208, where each access node 204, 206, 208 has a coverage area 240, 242, 244 that includes a cell-edge portion between the full strength coverage area and the edge of the cell coverage area. The coverage area 240, 242, 244 of access nodes 204, 206, 208 can be extended or configured to propagate inside buildings based on, for example, the operating frequency band and/or the Power Class/MOP level (and tolerances) of a particular wireless device 202A, 202B operating in connected mode with the access node 204, 206, 208.

A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty-five kilometers and an output power in the tens of watts. A short range access node can include a microcell access node, a picocell access node, a femtocell access node, or the like such as a home NodeB or a home eNodeB device. In an exemplary embodiment, a picocell access node can have a coverage area of approximately a half a kilometer and an output power of less than one watt. In yet another exemplary embodiment, a femtocell access node can have a coverage area in the range of fifty to two-hundred meters and an output power in the range of 0.5 to 1 watts. Femtocell access nodes can be cellular access nodes or WiFi access nodes. In addition, a wireless device configured to enter a hotspot mode can be a femtocell access node. It is noted that while three access nodes 204, 206, 208 are illustrated in FIG. 2, any number of access nodes can be implemented within system 200.

Access nodes 204, 206, 208 can comprise a processor and associated circuitry to execute or direct the execution of computer-readable instructions to obtain information. Access nodes 204, 206, 208 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 204, 206, 208 can receive instructions and other input at a user interface.

Gateway 210 can be any network node configured to interface with other network nodes using various protocols. Gateway 210 can communicate user data over system 200. Gateway 210 can be a standalone computing device, computing system, or network component, and can be accessible, for example, by a wired or wireless connection, or through an indirect connection such as through a computer network or communication network. For example, gateway 210 can include a Serving Gateway (SGW) and/or a Public Data Network Gateway (PGW), etc. One of ordinary skill in the art would recognize that gateway 210 is not limited to any specific technology architecture, such as LTE and can be used with any network architecture and/or protocol.

Gateway 210 can comprise a processor and associated circuitry to execute or direct the execution of computer-readable instructions to obtain information. Gateway 210 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 210 can receive instructions and other input at a user interface.

Controller node 212 can be any network node configured to communicate information and/or control information over system 200. Controller node 212 can be configured to transmit control information associated with a handover procedure. Controller node 212 can be a standalone computing device, computing system, or network component, and can be accessible, for example, by a wired or wireless connection, or through an indirect connection such as through a computer network or communication network. For example, controller node 212 can include a MME, a HSS, a PCRF, an AAA node, a RMS, a SPS, a policy server, etc. One of ordinary skill in the art would recognize that controller node 212 is not limited to any specific technology architecture, such as LTE and can be used with any network architecture and/or protocol.

Controller node 212 can comprise a processor and associated circuitry to execute or direct the execution of computer-readable instructions to obtain information. Controller node 212 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 212 can receive instructions and other input at a user interface.

Access node 204 can be in communication with access nodes 206 and 208 through communication links 220 and 230, respectively. Although not shown, access nodes 206 and 208 can be in communication with the other through a communication link. Access node 204 can be in communication with gateway node 210 through communication link 226 and with controller node 212 through communication link 228. Access node 206 can be in communication with gateway node 210 through communication link 222 and with controller node 212 through communication link 224. Access node 208 can be in communication with gateway node 210 through communication link 232 and with controller node 212 through communication link 234. Gateway node 210 can be in communication with controller node 212 through communication link 236 and with communication network 214 through communication link 238. Links 220, 222, 224, 226, 228, 230, 232, 234, 236, 238 can be wired or wireless and use various communication protocols such as Internet, IP, LAN, optical networking, HFC, telephony, T1, or some other communication format—including combinations, improvements, or variations thereof. Links 220, 222, 224, 226, 228, 230, 232, 234, 236, 238 can be a radio frequency, microwave, infrared, or other similar signal, and can use a suitable communication protocol, for example, GSM, CDMA, WiMAX, or LTE, or combinations thereof. Other wireless protocols can also be used. Links 220, 222, 224, 226, 228, 230, 232, 234, 236, 238 can be a direct link or might include various equipment, intermediate components, systems, and networks.

Communication network 214 can be a wired and/or wireless communication network, and can comprise processing nodes, routers, gateways, and physical and/or wireless data links for carrying data among various network elements, including combinations thereof, and can include a LAN or WAN, and an internetwork (including the internet). Communication network 214 can be capable of carrying data, for example, to support voice, PTT, broadcast video, and data communications by a wireless device such as wireless devices 202A, 202B. Wireless network protocols can comprise MBMS, CDMA 1×RTT, GSM, UMTS, HSPA, EV-DO, EV-DO rev. A, 3GPP LTE, and WiMAX. Wired network protocols that may be utilized by communication network 214 comprise Ethernet, Fast Ethernet, Gigabit Ethernet, Local Talk (such as Carrier Sense Multiple Access with Collision Avoidance), Token Ring, FDDI, ATM. Communication network 214 can also comprise additional base stations, controller nodes, telephony switches, internet routers, network gateways, computer systems, communication links, or some other type of communication equipment, and combinations thereof.

Referring to FIG. 2, wireless device 202A may be located in a radio range 240, 242, 244 of access nodes 204, 206, and/or 208 and equipped with an integrated transceiver (i.e., multiple satellite system, such as GPS and/or GLONASS). As wireless device 202A moves throughout a radio range 240, 242, 244 of access nodes 204, 206, and/or 208, wireless device 202A may use the transceiver to detect ranging satellite signals from access nodes 204, 206, and/or 208. Network 214 and/or access nodes 204, 206, and/or 208 may boost detected ranging satellite signals at the transceiver of wireless device 202A with data provided by the network 214 (e.g., through a GPS and/or GLONASS message sent to wireless device 102A via access nodes 204, 206, and/or 208), which data the transceiver can use to accelerate the process of acquiring ranging satellite signals to determine an outdoor position and/or location fix of wireless device 202A in a radio range 240, 242, 244 of access nodes 204, 206, and/or 208, while conserving battery and processing power of the wireless device 202A.

For example, network 214 may configure wireless device 202A to measure ranging satellite signals (e.g., broadcasted by access nodes 204, 206, and/or 208) and report the measurement data at access nodes 204, 206, and/or 208 (or other network element). Access nodes 204, 206, and/or 208 may use the reported measurement data to calculate a position and/or location fix of wireless device 202A in a radio range 240, 242, 244 of access nodes 204, 206, and/or 208. Alternatively, wireless device 202A may calculate, based on the measurement data, an outdoor position and/or location fix of wireless device 102A in the radio range 240, 242, 244 of access nodes 204, 206, and/or 208 using an iterative algorithm before reporting the calculated position and/or location fix at access nodes 204, 206, and/or 208.

Network 214 and/or access nodes 204, 206, and/or 208 may instruct wireless device 202A to report an UL Tx Power state (i.e., surplus Tx Power, PHR, ePHR, etc.) at access nodes 204, 206, and/or 208 (or other network element) periodically (e.g., by setting two timers PeriodicPHR-Timer and ProhibitPHR-Timer at wireless device 202A) and/or when a calculated signaling pathloss A (dl-PathlossChange) meets a threshold. Signaling pathloss may be calculated at wireless device 202A from a change (A) between, for example, signal strength/quality (i.e., RSSI, RSRP, RSRQ) indicator values of access nodes 204, 206, and/or 208 (i.e., Tx Power value) measured at wireless device 202A and the (current) UL Tx power state (i.e., surplus Tx Power, PHR, ePHR, etc.) of wireless device 202A. When the calculated signaling pathloss A meets or exceeds a signaling dl-PathlossChange threshold, network 214 and/or access nodes 204, 206, and/or 208 may configure wireless device 202A to report the UL Tx Power state values at access nodes 204, 206, and/or 208. PHR and ePHR reports are defined by sections 5.4.6 and 6.1.3.6a of 3GPP TS 36.321 Technical Specification Group Long Term Evolution; Evolved Universal Terrestrial Radio Access (E-UTRA); Medium Access Control (MAC) protocol specification (i.e., Release 12, version 12.5.0), the contents of which are incorporated by reference herein.

Access nodes 204, 206, and/or 208 may compare the measurement/UL Tx Power state reports and calculated pathloss change to reference value ranges stored at access nodes 202, 206, and/or 208 in a look-up table (illustrated in FIG. 3B) to classify a position and/or location fix of the wireless device 202A in a radio range 240, 242, 244 of access nodes 204, 206, and/or 208 as an outdoor, dense/urban, and/or indoor environment. Reference value ranges for PHR and/or ePHR and pathloss A, and a correlation of the reference PHR/ePHR/pathloss A value ranges to outdoor, dense/urban, and/or indoor environments, may be set based on, for example, drive-test data.

When the position and/or location fix of wireless device 202A is classified as an outdoor environment, access nodes 204, 206, and/or 208 may adjust/assign an outdoor mobility parameter to wireless device 202A and disable, for example, ECID and/or OTDoA techniques (illustrated in FIGS. 1A and 1B, above) used to boost A-GNSS unless there is no GPS and/or GONASS available (e.g., urban canyons). As wireless device 202A moves into a dense, urban area populated with closely-situated, multi-story buildings and/or indoors (i.e., where reception of ranging satellite signals from access nodes 204, 206, and/or 208 are limited due to multipath reflections and interference/obscuration) from an outdoor location within a radio range 240, 242, 244 of access nodes 204, 206, and/or 208, access nodes 204, 206 and/or 208 and/or network 214 can use the look-up table (illustrated in FIG. 3B) to classify a position and/or location fix of wireless device 202B in a radio range 240, 242, 244 of access node 204, 206, and/or 208 as a dense/urban or indoor environment.

For example, as wireless device 202B moves into a dense/urban or indoor environment, the network 214 and/or access nodes 204, 206, and/or 208 may configure wireless device 202B to measure ranging satellite signals detected/received from access nodes 204, 206, and/or 208 and report the measurement data associated with the ranging satellite signals at access nodes 204, 206, and/or 208. Access nodes 204, 206, and 208 may instruct wireless device 202B to calculate a signaling pathloss A and, when the signaling pathloss A meets or exceeds a signaling dl-PathlossChange threshold, to report UL Tx Power state (i.e., surplus Tx Power, PHR, ePHR, etc.) values at access nodes 204, 206, and/or 208. If the UL Tx Power state values reported by wireless device 202B at access nodes 204, 206, and/or 208 exceed a set difference (i.e., between the reported UL Tx Power state values and the reference UL Tx Power state values stored in the look-up table at access nodes 204, 206, and/or 208), then access nodes 204, 206, and/or 208 may classify a position and/or location fix of wireless device 202B in a radio range 240, 242, 244 of access node 204, 206, and/or 208 as a dense/urban or indoor environment. When the position and/or location fix of wireless device 202B is classified as a dense/urban or indoor environment, access nodes 204, 206, and/or 208 may adjust/assign an indoor mobility parameter to wireless device 202B and mobilize ECID and/or OTDoA techniques (illustrated in FIGS. 1A and 1B, above). For example, network 214 and/or access nodes 204, 206, and/or 208 may configure wireless device 202B to determine an exact position and/or location fix of wireless device 102B in the radio range 240, 242, 244 of access nodes 204, 206, and/or 208 using ECID and/or OTDoA techniques without using GNSS and/or A-GNSS, which eliminates TTFF (resultant from attempting to determine that GNSS and/or A-GNSS won't work) and network complexity.

Figure 3A:
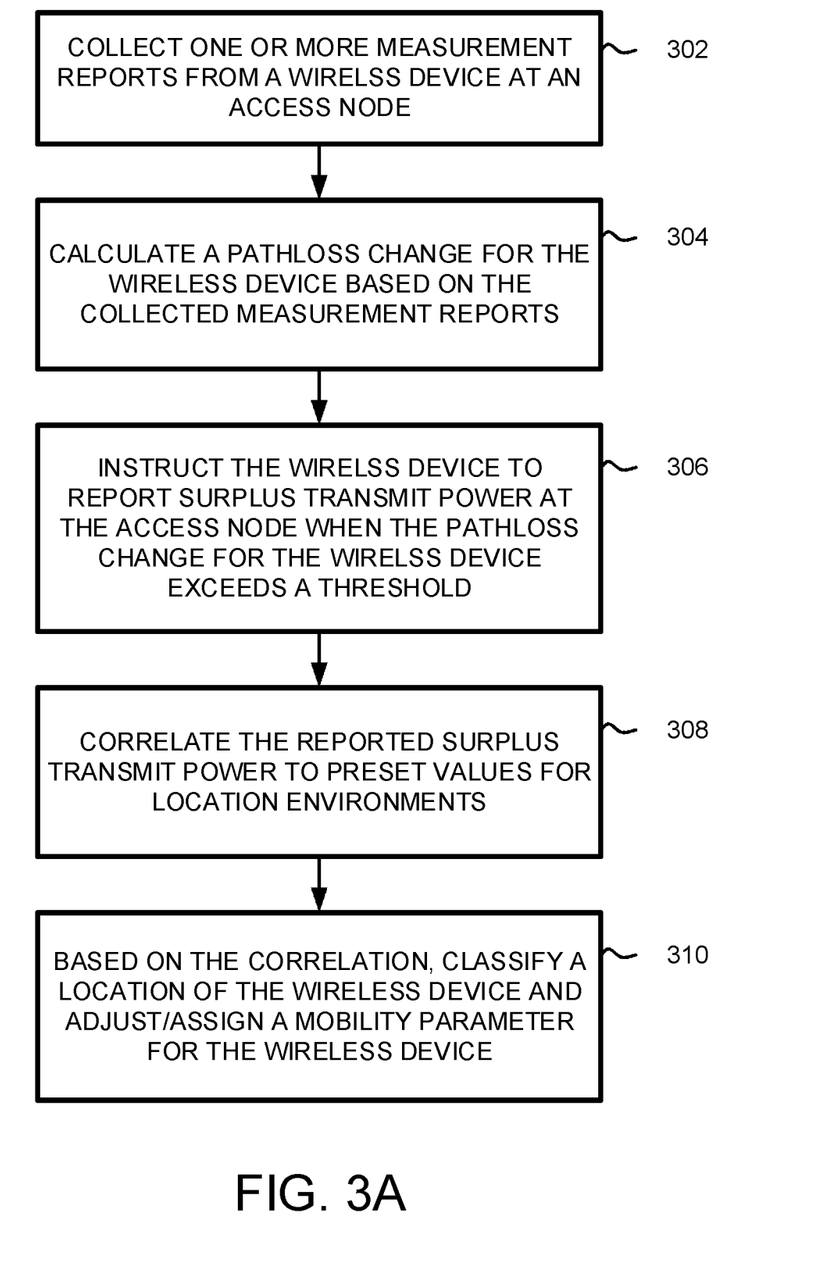
FIG. 3A illustrates a flow chart of an exemplary method for assigning a mobility parameter to a wireless device operating in connected mode.
Figure 3B:
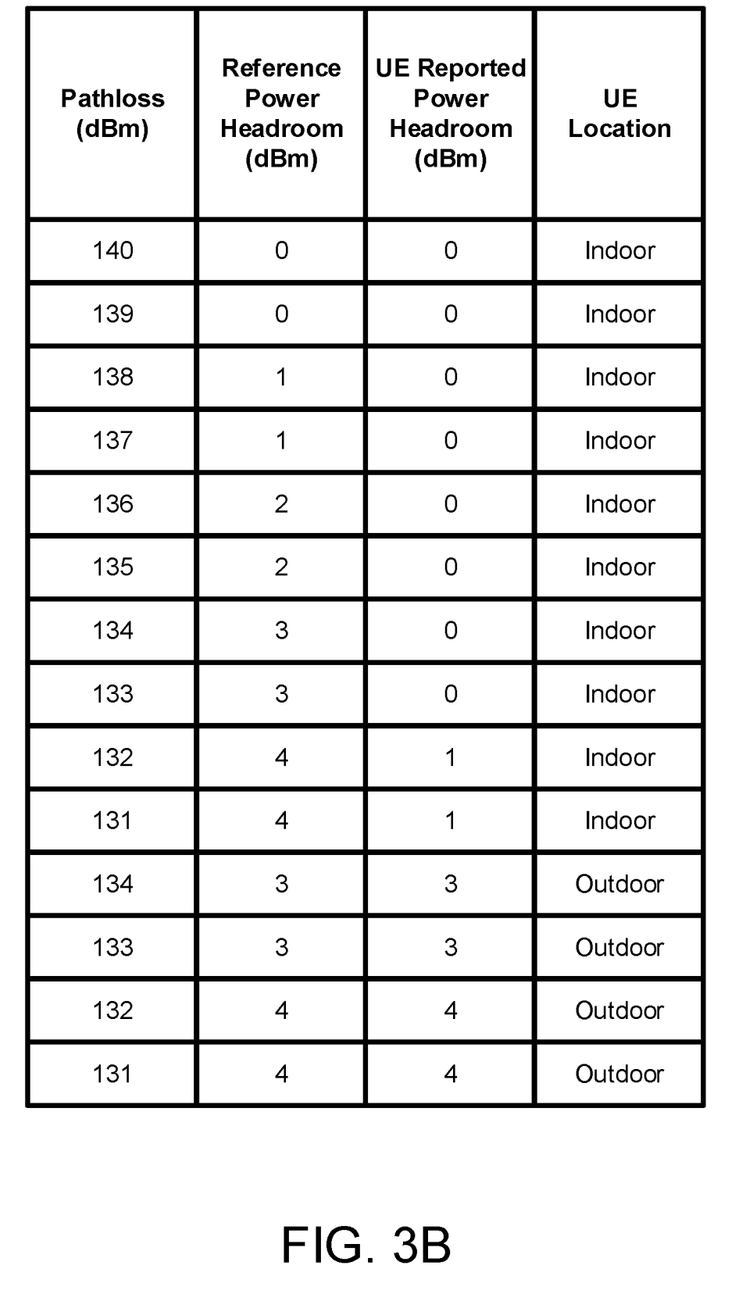
FIG. 3B illustrates an exemplary look-up table used for assigning a mobility parameter to a wireless device operating in connected mode.

FIG. 3A illustrates a flow chart of an exemplary method for assigning a mobility parameter to a wireless device operating in connected mode. The method will be discussed with reference to the exemplary communication system 200 illustrated in FIG. 2. However, the method for assigning a mobility parameter to a wireless device operating in connected mode illustrated in FIG. 3A can be implemented in the exemplary communication system 100 illustrated in FIGS. 1A and 1B, or with any suitable communication system. In addition, although FIG. 3A depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

Referring to FIG. 3A, wireless devices 202A, 202B (illustrated in FIG. 2) may be equipped with an integrated GNSS (i.e., multiple satellite system, such as GPS and GLONASS) transceiver (not shown) configured to detect GNSS ranging satellite signals from access nodes 204, 206, and/or 208 (or other network elements). Network 214 and/or access nodes 204, 206, and/or 208 may boost detected GNSS ranging satellite signals with data provided by the network 214 (e.g., through a GPS and/or GLONASS message sent to wireless device 202A, 202B via access nodes 204, 206, and/or 208), which data the GNSS transceiver can use to accelerate the process of acquiring GNSS ranging satellite signals to determine a position and/or location fix of the wireless device 202A, 202B in a radio range 240, 242, 244 of access nodes 204, 206, and/or 208.

For example, at 302, network 214 configures wireless device 202A, 202B to measure GNSS ranging satellite signals (e.g., broadcasted by access nodes 204, 206, and/or 208) and report the measurement data (e.g., code phase, Doppler, signal strength/quality (i.e., RSSI, RSRP, RSRQ), etc., associated with the GNSS ranging satellite signals) at access nodes 204, 206, and/or 208 (or other network element). Access nodes 204, 206, and/or 208 may collect the measurement reports; access nodes 204, 206, and/or 208 may use the reported measurement data and use the reported measurement data to calculate a position and/or location fix of wireless device 202A, 202B in a radio range 240, 242, 244 of access nodes 204, 206, and/or 208 (i.e., mobile-assisted A-GNSS). Alternatively, wireless device 202A, 202B may be configured to measure GNSS ranging satellite signals and, based on the measurement data, calculate a position and/or location fix of the wireless device 202A, 202B in the radio range 240, 242, 244 of access nodes 204, 206, and/or 208 using an iterative algorithm before reporting the calculated position and/or location fix at access nodes 204, 206, and/or 208 (i.e., mobile-based A-GNSS).

Although both mobile-assisted and mobile-based A-GNSS improve reported position and/or location fix accuracy for wireless device(s) 202A, 202B outdoors (e.g., where there exists a reasonably clear view of the sky), as the wireless device 202A, 202B moves into dense, urban areas populated with closely-situated, multi-story buildings and/or indoors, obtaining an accurate position and/or location fix of the wireless device 202A, 202B using A-GNSS is difficult due to increased multipath reflections and interferences/obscurations, which increase error margins for a position and/or location fix reported by wireless device 202A, 202B.

At 304 and 306, network 214 instructs wireless device 202A, 202B to report an UL Tx Power state (i.e., surplus Tx Power, PHR, ePHR, etc.) at access nodes 204, 206, and/or 208 (or other network element) periodically (e.g., by setting two timers PeriodicPHR-Timer and ProhibitPHR-Timer at wireless device 202A, 202B) and/or when a calculated signaling pathloss A (dl-PathlossChange) meets a threshold. Signaling pathloss is calculated at wireless device 202A, 202B from a change (A) between signal strength/quality (i.e., RSSI, RSRP, RSRQ) indicator values of access nodes 204, 206, and/or 208 (i.e., Tx Power values) measured at the GNSS transceiver of wireless device 202A, 202B and the (current) UL Tx Power state (i.e., surplus Tx Power, PHR, and/or ePHR, etc.) of wireless device 202A, 202B. When the calculated signaling pathloss A meets or exceeds a signaling dl-PathlossChange threshold, network 214 may configure wireless device 202A, 202B to report the UL Tx Power state of the wireless device 202A, 202B at access nodes 204, 206, and/or 208.

At 308, network 214 and/or access nodes 204, 206, and/or 208 compare the reported UL Tx Power state (i.e., surplus Tx Power, PHR, ePHR, etc.) of the wireless device 202A, 202B to reference value ranges for UL Tx Power states (i.e., surplus Tx Power, PHR, ePHR, etc.) stored at a look-up table (illustrated in FIG. 3B) at access nodes 204, 206, and/or 208) to classify a position and/or location fix of the wireless device 202A, 202B in a radio range 240, 242, 244 of access nodes 204, 206, and/or 208 as an outdoor, dense/urban, and/or indoor environment. Network 214 and/or access nodes 204, 206, and/or 208 may further compare the reported/calculated signaling pathloss A to reference value ranges for signaling pathloss A's stored at the look-up table (illustrated in FIG. 3B) at access nodes 204, 206, and/or 208) to classify a position and/or location fix of the wireless device 202A in a radio range 240, 242, 244 of access nodes 204, 206, and/or 208 as an outdoor, dense/urban, and/or indoor environment. Reference value ranges for the surplus Tx Power, PHR, and/or ePHR and/or reference value ranges for the signaling pathloss A stored at the look-up table at access nodes 204, 206, and/or 208, and a correlation of those reference value ranges to outdoor, dense/urban, and/or indoor environments, may be set based on, for example, drive-test data.

At 310, network 214 and/or access nodes 204, 206, and/or 208 classifies a position and/or location fix of wireless device 202A, 202B as an outdoor and/or indoor environment. For example, network 214 and/or access nodes 204, 206, and/or 208 may classify a location of wireless device 202A as an outdoor environment based on the comparison (performed at 308) of UL Tx Power states and/or signaling pathloss A values. Based on the outdoor classification, network 214 and/or access nodes 204, 206, and/or 208 may adjust/assign an outdoor mobility parameter to wireless device 202A and disable ECID and/or OTDoA techniques (discussed with reference to FIGS. 1A and 1B, above) used to boost A-GNSS unless there is no GPS and/or GONASS available (e.g., urban canyons). Network 214 and/or access nodes 204, 206, and/or 208 may classify a location of wireless device 202B as an outdoor or indoor environment based on the comparison (performed at 308) of UL Tx Power states and/or signaling pathloss A values. Based on the outdoor or indoor classification, network 214 and/or access nodes 204, 206, and/or 208 may adjust/assign an indoor mobility parameter to wireless device 202B and mobilize ECID and/or OTDoA techniques (discussed with reference to FIGS. 1A and 1B, above) without using A-GNSS to eliminate time it takes to determine that A-GNSS. This eliminates TTFF (resultant from attempting to determine that GNSS/A-GNSS won't work) and network complexity.

One skilled in the art, using the disclosure provided herein, will appreciate that various steps of the methods can be omitted, rearranged, combined and/or adapted in various ways and can be completed by multiple wireless devices and access nodes, for example between wireless devices 202A and 202B.

Figure 4:
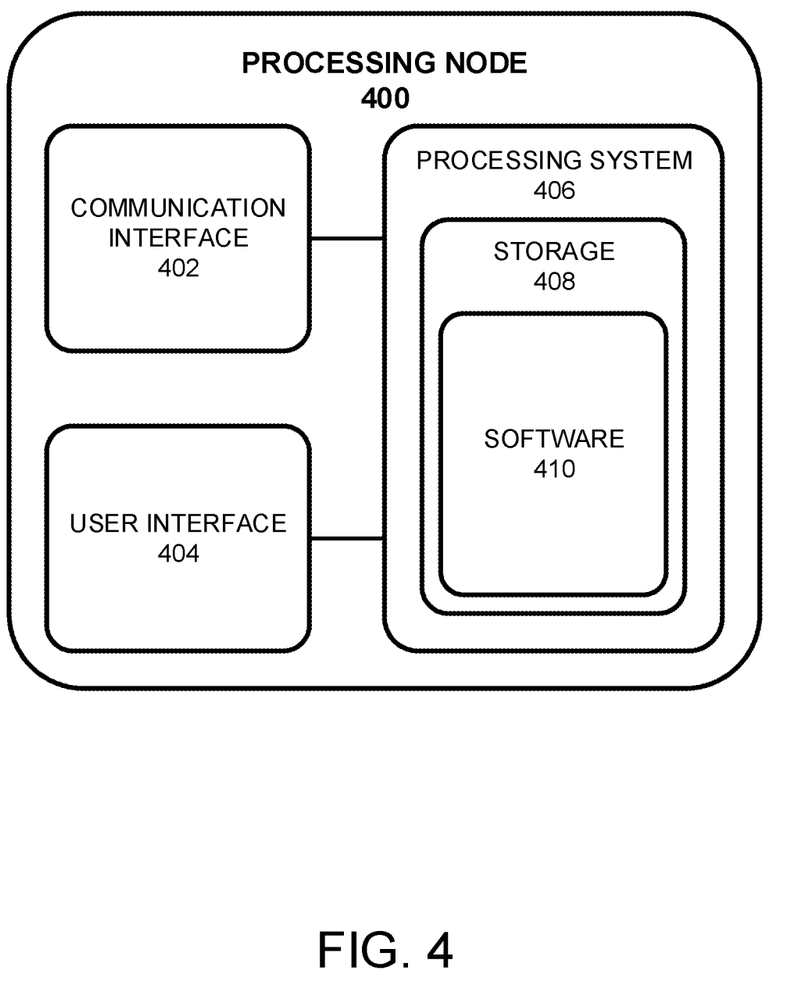
FIG. 4 illustrates an exemplary processing node.

FIG. 4 illustrates an exemplary processing node 400 in a communication system. Processing node 400 comprises communication interface 402, user interface 404, and processing system 406 in communication with communication interface 402 and user interface 404. Processing node 400 can be configured to determine a communication access node for a wireless device. Processing system 406 includes storage 408, which can comprise a disk drive, flash drive, memory circuitry, or other memory device. Storage 408 can store software 410 which is used in the operation of the processing node 400. Storage 408 may include a disk drive, flash drive, data storage circuitry, or some other memory apparatus. Software 410 may include computer programs, firmware, or some other form of machine-readable instructions, including an operating system, utilities, drivers, network interfaces, applications, or some other type of software. Processing system 406 may include a microprocessor and other circuitry to retrieve and execute software 410 from storage 408. Processing node 400 may further include other components such as a power management unit, a control interface unit, etc., which are omitted for clarity. Communication interface 402 permits processing node 400 to communicate with other network elements. User interface 404 permits the configuration and control of the operation of processing node 400.

Examples of processing node 400 include access nodes 104, 104A, 104B, 104C, 204, 206, 208, network node 110, gateway node 210, and controller node 212. Processing node 400 can also be an adjunct or component of a network element, such as an element of access nodes 104, 104A, 104B, 104C, 204, 206, 208, network node 110, gateway node 210, and controller node 212. Processing node 400 can also be another network element in a communication system. Further, the functionality of processing node 400 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for assigning a mobility parameter to a wireless device, the method comprising:
    collecting, at an access node, one or more measurement reports from a wireless device;
    calculating a pathloss change for the wireless device based on the collected measurement reports;
    instructing the wireless device to report surplus transmit power at the access node when the calculated pathloss change exceeds a threshold;
    correlating the reported surplus transmit power and calculated pathloss change to preset reference values corresponding to location environments;
    classifying a location environment of the wireless device based on the correlation;
    assigning a mobility parameter for the wireless device based on the classified location environment; and
    enabling position estimation of the wireless device using one or more signals communicated between one or more access nodes and the wireless device, the enabling being based on the assigned mobility parameter.

2. The method of claim 1, wherein the measurement report includes data of one or more of RSSI, RSRP, and RSRQ.

3. The method of claim 2, wherein the measurement data is used to calculate the location environment of the wireless device in a radio range of the access node.

4. The method of claim 1, wherein the surplus transmit power report includes one or more of an uplink transmit power state, Power Headroom Report (PHR), and Extended Power Headroom Report (ePHR).

5. The method of claim 4, wherein the pathloss is calculated at the wireless device from a change between a transmit power value of the access node and the surplus transmit power report of the wireless device.

6. The method of claim 1, wherein the location environments are one of outdoor, dense/urban, and indoor environments.

7. The method of claim 6, wherein the correlating further comprises comparing the reported surplus transmit power of the wireless device to reference value ranges for surplus transmit power stored at a look-up table at the access node.

8. The method of claim 1, wherein the assigned mobility parameter corresponds to an indoor environment.

9. The method of claim 8:
    wherein the using one or more signals communicated between one or more access nodes and the wireless device comprises implementing Enhanced Cell ID (ECID) and/or Observed Time Difference of Arrival (OTDoA) techniques to determine a position of the wireless device in a radio range of the access node.

10. A system for assigning a mobility parameter to a wireless device, the system comprising:
a controller configured to:
collect, at an access node, one or more measurement reports from a wireless device;
calculate, at a processing node, a pathloss change for the wireless device based on the collected measurement reports;
instruct the wireless device to report surplus transmit power at the access node when the calculated pathloss change exceeds a threshold;
correlate the reported surplus transmit power and the calculated pathloss change to preset reference values corresponding to location environments;
classify a location environment of the wireless device based on the correlation;
assign a mobility parameter for the wireless device based on the classified location environment; and
enable position estimation of the wireless device using one or more signals communicated between one or more access nodes and the wireless device, the enabling being based on the assigned mobility parameter.

11. The system of claim 10, wherein the measurement report includes measurement data associated with ranging satellite signals received at the wireless device.

12. The system of claim 11, wherein the measurement data includes one or more of code phase, Doppler, RSSI, RSRP, and RSRQ.

13. The system of claim 12, wherein the measurement data is used to calculate the location environment of the wireless device in a radio range of the access node.

14. The system of claim 10, wherein the surplus transmit power report includes one or more of an uplink transmit power state, Power Headroom Report (PHR), and Extended Power Headroom Report (ePHR).

15. The system of claim 14, wherein the pathloss change is calculated at the wireless device from a change between a transmit power value of the access node and the surplus transmit power report of the wireless device.

16. The system of claim 10, wherein the location environments are one of outdoor, dense/urban, and indoor environments.

17. The system of claim 16, wherein the controller is further configured to compare the reported surplus transmit power of the wireless device to reference value ranges for surplus transmit power stored at a look-up table at the access node.

18. The system of claim 10, wherein
wherein the using one or more signals communicated between one or more access nodes and the wireless device comprises implementing Enhanced Cell ID (ECID) and/or Observed Time Difference of Arrival (OTDoA) techniques to determine a position of the wireless device in a radio range of the access node.

19. A method for classifying a wireless device operating in a radio range of an access node, the method comprising:
instructing a wireless device to report surplus transmit power at an access node when a pathloss change of the wireless device exceeds a threshold;
correlating the reported surplus transmit power to preset location value ranges in response to the pathloss change exceeding the threshold;
based on the correlation, classifying a location environment of the wireless device in the radio range of the access node as indoor or outdoor; and
enabling position estimation of the wireless device using one or more signals communicated between one or more access nodes and the wireless device, the enabling being based on the classified location environment.

* * * * *